United States Patent Office 3,451,846
Patented June 24, 1969

3,451,846
PROCESS OF MAKING XEROGRAPHIC PLATE
Richard L. Lane, Penfield, and Robert N. Jones, Fairport, N.Y., assignors to Xerox Corporation, Rochester, N.Y., a corporation of New York
Filed May 13, 1966, Ser. No. 549,840
Int. Cl. C03c 21/00; G03g 15/00
U.S. Cl. 117—201                                            6 Claims

ABSTRACT OF THE DISCLOSURE

A method of improving the humidity stability and abrasion resistance of a xerographic glass binder plate having photoconductive particles dispersed in a glass binder. The method comprises exposing the plate to a source of selenium maintained at a temperature above about its melting point, and maintaining the glass binder plate at a temperature below about the softening point of the glass, and maintaining these conditions for a time sufficient to diffuse selenium into the surface of the glass plate.

---

Figure 1:
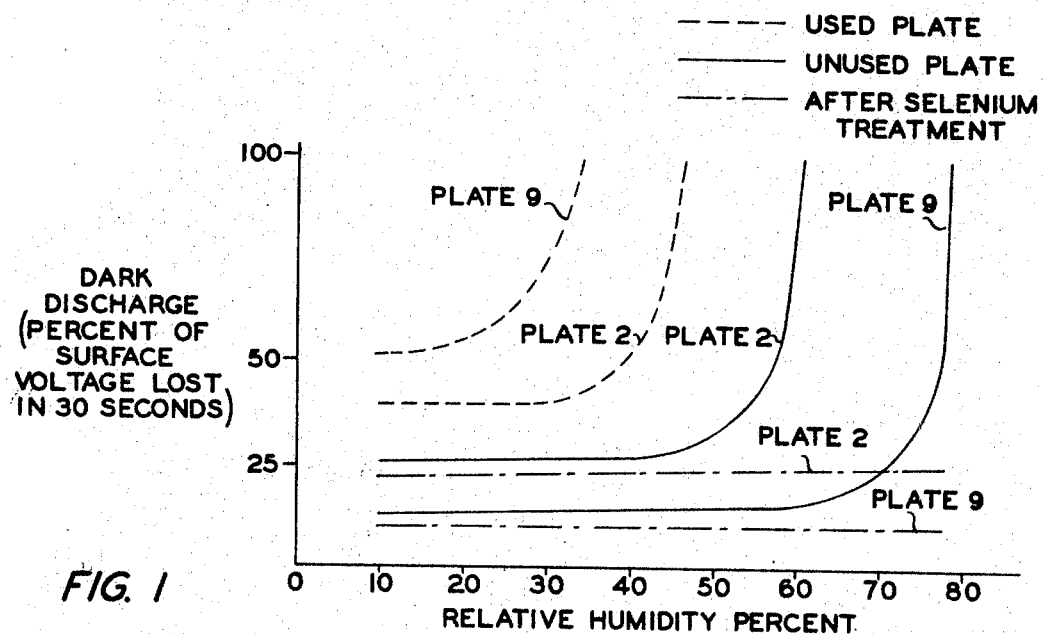

This invention relates in general to glass, and more specifically, to a system for improving the humidity stability of oxide glass surfaces.

Glass is commonly used in electrical applications as a dielectric surrounding or in direct contact with an electrical conductor. These applications require that the glass be a good insulator. It is known that under conditions of high humidity, oxide glasses commonly used as electrical insulators, become to a certain degree, conductors of electricity. This humidity limit is in the range of about 40 to 60 percent for glasses used as electrical insulators.

In a similar manner, in the art of xerography, as originally disclosed by Carlson in U.S. Patent 2,297,691, and many related patents in the field, the problem of humidity sensitivity due to high humidity conditions either alone or in combination with surface abrasion is well recognized. This is especially true in regard to glass binder plates such as those shown in U.S. Patent 3,151,982 to Corrsin. These plates comprise a mixture of finely divided photoconductive insulating particles in a non-photoconductive insulating glass enamel binder. Glass binder plates have an operating life many times greater than that of vitreous selenium and may be controlled to yield spectral sensitivities much greater than that of any of the presently used commercial xerographic plates. It is well known, however, that these glass binder plates are humidity sensitive in that there is a limiting humidity above which xerographic imaging is impossible due to surface (lateral) conductivity. Generally this humidity limit is in the range of about 40 to 50 percent for conventional glasses used in xerographic drum preparation, and this limit may be significantly lowered by surface abrasion.

It is, therefore, an object of this invention to provide a method of treating oxide glasses to improve their humidity stability and abrasion resistance.

It is another object of this invention to provide a method of improving the electrical insulating properties of oxide glasses.

It is yet another object of this invention to provide an improved electrically stable glass dielectric.

It is yet a further object of this invention to provide a xerographic glass binder plate having enhanced xerographic properties substantially independent of changes in humidity.

It is another object of this invention to provide a glass binder plate which operates effectively under conditions of high humidity and abrasion.

The foregoing objects and others are accomplished in accordance with this invention by providing a method of improving the humidity stability and wear resistance of oxide glasses which are subject to degradation in their electrical insulating properties when subjected to relatively high humidity or under conditions of high humidity and abrasion, by diffusing small amounts of selenium into the surface of the glass at relatively high temperatures. This treatment results not in a mere overcoating of selenium on the surface of the glass, but rather appears to be a substitution of selenium atoms for oxygen in the top surface area of said glass. This treatment results in an increase in humidity stability from about 40 percent relative humidity to at least about 80 percent relative humidity.

The advantages of this method will become apparent upon consideration of the following disclosure of the invention; especially taken in conjunction with the following drawings wherein:

FIGURE 1 is a graph which illustrates the rate of dark discharge at different humidity conditions for two photoconductor containing plates.

Figure 2:
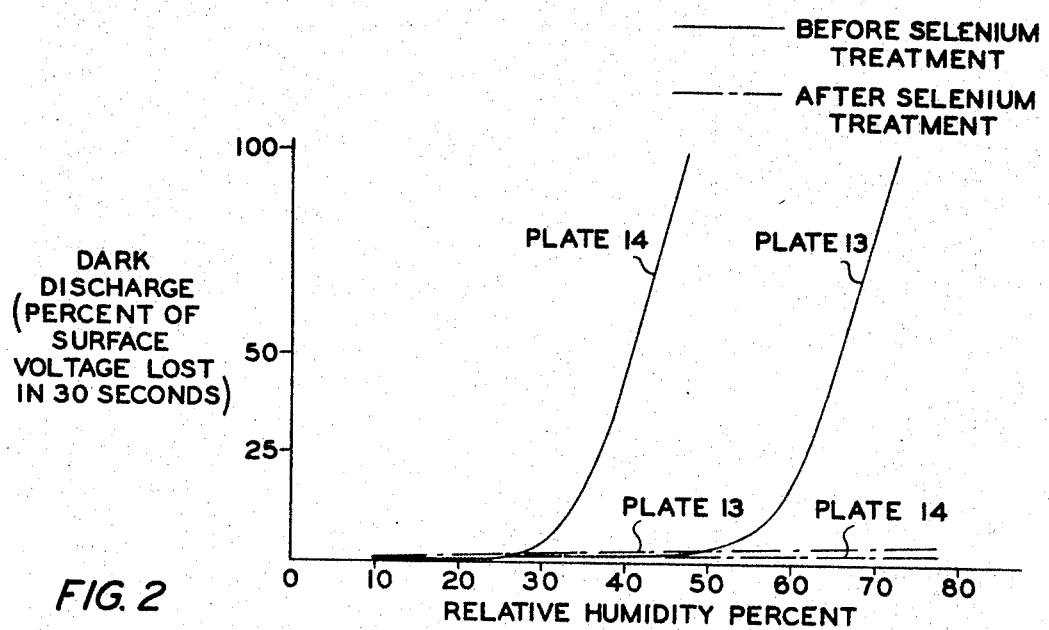

FIGURE 2 graphically illustrates the rate of dark discharge at different humidity conditions for two non-photoconductive insulating glasses.

The selenium may be diffused into the glass by several methods such as exposing the glass to be treated to vapors of substantially pure selenium at temperatures up to about the firing temperature of the particular glass. The glass may also be preheated to a temperature near the firing or softening point and then while heated, sprayed with selenium vapors.

The preheated glass may also be dipped into a bath of molten selenium.

In another embodiment, the glass to be treated is placed in a tube-type furnace and preheated to a temperature near the fusion point of the glass. An inert carrier gas such as helium is then used to transport a source of selenium vapors over the glass to allow diffusion of the selenium into the surface of the glass.

The temperature to which the glass is heated when treated depends upon the composition of the particular glass. Normally this temperature ranges from about 300 to 1200 degrees C. The time of treatment is directly related to the temperature and the glass composition. The higher the temperature, the shorter the time for diffusion of selenium into the glass. Times of 10 minutes to several hours can be used depending upon the temperature of treatment and glass composition. In all cases, though, it is essential that selenium atoms be diffused into the glass surface.

A preferred treatment is with an atmosphere consisting of vapors of substantially pure selenium. The glass article to be treated is placed in a vacuum tight chamber with a small amount of selenium. The chamber is then evacuated to a vacuum of about $10^{-4}$ cm. of mercury and sealed. The chamber is then heated to about 300 to 600 degrees C. for about 10 minutes to one hour. The chamber is then cooled to ambient temperature and the glass removed from the chamber. An irridescent film is observed on the plate and is cleaned off by washing and rubbing with a clean towel. The resulting glass plate is observed to be very hydrophobic, and exhibits the desired improved humidity stability and wear resistance referred to above. This treatment raises the relative humidity stability limit to about 85 percent. The vapor treatment is preferred in that it is easily carried out and insures that selenum atoms are quickly diffused into the glass structure.

Although the theory underlaying the present invention is not fully understood, it is believed that a major factor involved in the humidity sensitivity of oxide glasses is the molecular structure of the surface of said glasses, where the oxygen prevalent on the surface results in an effective ionic charge. When these oxide glasses are cooled from a melt, therefore, water is most probably chemically adsorbed on the surface in an ionic configuration. Under ambient conditions where the glass surface is at equilibrium with the atmosphere and water adsorption is physical, an increase in the thickness of the water layer results and speculation might allow that these additional adsorbed layers are ionized to some degree as a result of the ionic nature of the previous layers. This theory would exclude the necessity of the presence of alkali ions or adsorbed gasses in the water layer to account for electrical conductivity.

If this theory of the problem is reasonably accurate, then an intrinsic solution would lie in chemically combining or replacing the surface oxygen in order to lessen the adsorption tendency and eliminate the ionization of water which is adsorbed. This would be accomplished by reacting the hot surface of the glass with a suitable material such as selenium.

The theory of humidity sensitivity in regard to glass binder plates is thought to be due to the fact that as the humidity increases there is a limiting humidity above which xerographic imaging is impossible due to surface (lateral) conductivity. For conventional untreated plates this humidity limit is about 40 to 50 percent in the case of conventional xerographic glasses such as those described in U.S. Patent 3,151,982 to Corrsin. In commercial use where a glass drum is used in a xerographic machine, the humidity limit of said glass drum in regard to imaging decreases to about 30 percent even though no physical wear is visible on the surface of the drum even when viewed with an electron microscope. As stated above, high temperature treatment to diffuse selenium into the glass plate increases the relative humidity permissible during printing to about 85 percent.

In one embodiment of this invention, the high temperature selenium treatment is applied to xerographic glass binder plate such as those disclosed in the above mentioned Corrsin patent.

The glass binder may be broadly defined as a highly insulating fused inorganic non-photoconductive glass. It is made up in various combinations of three types of basic oxides used in making frits: acidic, basic and neutral or amphoteric. These glasses are adequately defined in the patent to Corrsin mentioned above, with the acidic oxides being mainly $SiO_2$ and $P_2O_5$ which are network forming and raise the viscosity and melting point when in excess. Less acidic or neutral oxides such as $B_2O_3$, $Sb_2O_3$ and $As_2O_3$ do not raise the viscosity and melting point; in fact, $B_2O_3$ lowers viscosity. The basic oxides such as $Na_2O$, CaO, $K_2O$, MgO, BaO, PbO, ZnO and CdO are network stoppers and lower viscosity and melting point by making the glass network of oxygen bridges less extensive.

The main criteria of a desirable frit for imbedding photoconductors to make a xerographic plate are low fusing temperatures and inertness in forming poisoning byproducts by reaction with the photoconductor. A typical frit consists of from 50 to 75 mole percent of combined $B_2O_3$ and the remainder basic oxides.

The photoconductive materials useful in the glass binder plates include those materials disclosed in the prior art which are useful in xerographic binder plates. In general, a photoconductor is suitable in a binder plate if it shows a resistivity in the dark of about $10^9$ ohm-cm. and a lower resistivity when exposed to light. Typical materials which have been found useful in xerographic binder plates in which may be readily used in the glass binder plate include without limitation, cadimum strontium sulfide, zinc sulfide, zinc oxide, zinc selenide, cadmium sulfide, cadmium selenide, mercuric sulfide, antimony sulfide, arsenic sulfide, lead monoxide, gallium selenide, indium sulfide, arsenic selenide, mercuric oxide, titanium dioxide, zinc titanate, zinc magnesium oxide, zinc silicate, lead monoxide, red lead, etc. Cadmium sulfoselenides are preferred in that they give excellent photoconductive properties that are easily mixed with the glass binder matrix. The photoconductive particles are present by weight in amounts up to 60 percent of the glass binder plate with the inorganic glass matrix making up the remainder of the photoconductive layer.

The glass binder plate may be supported on any convenient electrical ground or backing plate. Typical materials which may be used include metals such as aluminum, brass, stainless steel, copper, nickel, zinc, etc. Conductively coated glass and other non-metal conductive substrates may also be used.

The glass binder for the xerographic embodiment of this invention may be made up from compositions generally selected from the ranges set forth in Table I below. All figures are in mole percent.

Table I

| | |
|---|---|
| $B_2O_3$ | 0–50 ⎫ |
| $SiO_2$ | 0–50 ⎬ 40–75 combined. |
| $TiO_2$ | 0–10 ⎭ |
| CaO | ⎫ |
| ZnO | ⎬ |
| CdO | ⎬ 10–35 combined. |
| PbO | ⎭ |
| $Na_2O$ | ⎫ |
| $K_2O$ | ⎬ 0–20 combined. |
| $Li_2O$ | ⎭ |
| NaF | 0–10 |
| $Al_2O_3$ | 0–5 |
| $Sb_2O_3$ | 0–10 |
| $As_2O_3$ | 0–3 |

It should be pointed out that these ranges of composition may be varied and modfied as would be obvious to those skilled in the art.

Five specific glass compositions which are illustrative of those contemplated by this invention are listed below in Table II. These compositions are given in weight percent.

| Sample | CaO | SiO | $Na_2O$ | $B_2O_3$ | PbO | CdO | $F_2$ | $Li_2O$ | $TiO_2$ | $ZnO_2$ | BaO | $Al_2O_3$ | $K_2O$ | MgO |
|---|---|---|---|---|---|---|---|---|---|---|---|---|---|---|
| Glass A | 2.5 | 44 | 14 | 8 | 15 | 3.4 | 4.0 | 3.0 | 5.4 | | | 0.5 | 0.2 | |
| Glass B | 0.1 | 54 | 11 | 8.2 | 11 | 0.6 | 6 | 0.8 | 6.04 | 1.1 | 0.6 | 0.1 | 0.1 | |
| Glass C | | 18.1 | .05 | 8.1 | 65.7 | 7.8 | | | .08 | .02 | 0.1 | | 0.05 | |
| Glass D (Pyrex) | | 80.5 | 3.8 | 12.9 | | | | | | | | 2.2 | 0.4 | |
| Glass E (typical window glass) | 10.6 | 72.3 | 13.5 | | | | | | | | 0.6 | 1.9 | 0.5 | 0.2 |

Four specific photoconductive compositions are illustrative of those contemplated by this invention and are listed below in Table III. In general, the photoconductor can comprise up to about 60 percent by weight of the total composition with the glass binder making up the balance of the composition.

Table III

| | Composition |
|---|---|
| 1 | Cadmium sulfide (CdS). |
| 2 | Cadmium sulfoselenide (CdSSe) (60 mole percent CdS–40 mole percent CdSe). |
| 3 | Cadmium selenide (CdSe). |
| 4 | Zinc sulfoselenide (ZnSSe) (50 mole percent ZnS–50 mole percent ZnSe). |

Glass plates designated 1 to 14 were made utilizing glass compositions A, B, C, D and E, respectively, as illustrated in Table II. Each of the plates 1 to 12 was made incorporating the photoconductive materials of Table III. Glass plates 13 and 14 made of Pyrex and window glass, respectively, contained no photoconductive material. Glass plates 1 to 12 were formed by the well known conventional techniques such as those set forth in the above mentioned Corrsin patent. Samples 13 and 14 are composed of a 5 mil thick sheet of glass of the stated composition. Plates 1 to 12 are composed of 50 microns of glass on an 8 mil steel substrate 1 inch square. Table IV below illustrates the specific glass plates which were tested by the selenium treatment of this invention.

TABLE IV

| Plate No. | Glass composition (Table II) | Photoconductor (Table III) | Amt. of photoconductor (percent by weight) |
|---|---|---|---|
| 1 | A | Cadmium sulfide | 10 |
| 2 | A | Cadmium sulfoselenide | 20 |
| 3 | A | Cadmium selenide | 30 |
| 4 | A | Zinc sulfoselenide | 40 |
| 5 | B | Cadmium sulfide | 10 |
| 6 | B | Cadmium sulfoselenide | 20 |
| 7 | B | Cadmium selenide | 30 |
| 8 | B | Zinc sulfoselenide | 40 |
| 9 | C | Cadmium sulfide | 10 |
| 10 | C | Cadmium sulfoselenide | 20 |
| 11 | C | Cadmium selenide | 30 |
| 12 | C | Zinc sulfoselenide | 40 |
| 13 | D | None | |
| 14 | E | ...do | |

In FIGURE 1 the rate of dark discharge in 30 seconds from an initial potential of −600 volts is measured by an electrometer under dark room conditions, and plotted against increasing humidity for plates 2 and 9 in the used and unused condition. Used or abraded plates are those which are cycled for 7000 cycles under the imaging conditions set forth in Example I, while unused means a fresh, newly formed or unused plate. It can be seen from FIGURE 1 that both the used and unused plates exhibit outstandingly low dark discharge after the selenium treatment.

FIGURE 2 shows a similar situation in regard to the non-photoconductive plates wherein plates 13 and 14 both show greatly reduced dark discharge after being selenium treated by the novel method of this invention.

The following examples further specifically define the present invention with respect to a method of improving the humidity stability of glass binder plates. Parts and percentages in the disclosure, examples and claims are by weight unless otherwise indicated. The examples below are intended to illustrate the various preferred embodiments of carrying out a method of selenium treating glass binder plates to improve humidity stability.

Example I

Plates 1 to 12 of Table IV are corona charged to a negative surface potential of about 600 volts by the device shown in U.S. Patent 2,777,957 to Walkup. The plates are then exposed to an image of light and shadow by means of a 10 watt tungsten light source at a distance of about 24″ for about 2 seconds to form an image. The surrounding environment is humidity controlled to a relative humidity of about 30 percent. The latent image is then developed by cascading an electroscopic marking material over the photoconductive surface of the plate. The developed image is then transferred to a sheet of paper, and heat fused to make it permanent. The resulting image is a clear readable copy of the original.

Example II

Plates 1 to 12 are flooded with light to discharge the plate, cleaned with a fur brush, and again treated by the method of Example I. The humidity is increased to a relative humidity of about 50 percent. The images on all of the plates are blurred or no image is formed due to the loss of charge because of the high humidity.

Example III

The humidity is raised to 80 percent relative humidity and plates 1 to 12 are again recycled as in Examples I and II. Most of the plates exhibited no image at all while a few plates exhibit extremely blurred images.

Example IV

Glass plates 1, 5 and 9 are placed in a chamber evacuated to pressure of about 32 mm. of mercury and containing approximately 3 grams of selenium pellets contained in an open molybdenum boat. The vacuum chamber was then heated to a temperature of about 500° C. and maintained at this temperature 30 minutes during which time the atmosphere inside the tube is substantially all vaporous selenium. At the end of 30 minutes, the chamber is allowed to cool to room temperature, the vacuum broken, and the selenium treated plates removed from the chamber.

Example V

Glass plates 1, 5 and 9 are then cycled through the imaging processes defined in Examples I, II, and III. Each of the plates exhibits a clear readable copy of the original image at all three humidity conditions after being treated as in Example IV above.

Example VI

Glass plates 2, 6 and 10 are preheated in an electrical resistance furnace to a temperature of about 525° C. The plates are then immediately transferred to a quartz beaker filled with molten selenium and held at a temperature of about 350° C. by maintaining the beaker over the flame of a gas burner. The plates are immersed in the molten selenium for about 10 minutes then removed from the bath and allowed to cool to room temperature.

Example VII

The selenium treated glass plates of Example VI are cycled through the imaging processes defined in Examples I, II and III. Each of plates 2, 6 and 10 shows a clear readable copy of the original image at all these humidities (30, 50 and 80 percent relative humidity).

Example VIII

Glass plates 3, 7 and 11 are preheated in an electrical resistance furnace to a temperature of about 500° C. The plates are then exposed in open air to a spray of selenium vapors from a quartz beaker containing molten selenium maintained at a temperature of about 350° C. by a gas burner. The vapors of selenium generated by the molten selenium bath are directed against the surface of the glass plates for about 20 minutes. The selenium treated plates are then allowed to cool to room temperature.

Example IX

The selenium treated glass plates of Example VIII are then cycled through the imaging processes defined in Examples I, II and III. Each of plates 3, 7 and 11 shows a clear readable copy of the original image at all three humidity conditions (30, 50 and 80 percent relative humidity).

Example X

Glass plates 4, 8 and 12 are placed in the center of a 36″ long, 3″ diameter, stainless steel tube furnace which is resistance heated to a temperature of about 550° C. at the center section containing the glass plates. A molybdenum boat containing selenium pellets is placed at one end of the furnace and heated to a temperature of about 350° C. A source of helium gas is flowed at the rate of about 10 cu. ft./min. over the selenium furnace. The vapors of selenium are flowed over the glass plates through the use of the helium carrier gas. The selenium-helium mixture is flowed over the surface of the glass for about 1 hour. The furnace is then cooled to room temperature, and the plates removed from the furnace.

Example XI

The selenium treated plates of Example X are then cycled through the imaging processes defined in Examples I, II and III. Each of plates 4, 8 and 12 shows a clear readable copy of the original image when tested at humidities of 30, 50 and 80 percent relative humidity.

Example XII

Plates 13 and 14 comprising Pyrex and window glass, respectively, and which contain no photoconductive material, are corona charged to about 600 volts negative potential under dark room conditions. Through the use of an electrometer, the dark discharge is measured for a 30 second period with the percentage of dark discharge being the voltage loss in 30 seconds over the initial voltage. These plates are tested under humidity conditions of 30, 50 and 80 percent relative humidity. The plates show a dark discharge of about 5 percent at 30 percent relative humidity, but when the humidity was increased to 80 percent relative humidity, the dark discharge or loss of voltage due to the conductive state of the glass was infinite, i.e. the glass would not hold a charge.

Example XIII

Plates 13 and 14 are then selenium vapor treated by the method of Example IV except that the boat temperature is increased to about 575° C. The plates are then corona charged again, as in Example XII, to a negative surface potential of about 600 volts, and measured for their dark discharge rate at humidity conditions of 30, 50 and 80 percent relative humidity. These plates which have been selenium treated now show a dark discharge in 30 seconds of less than 5 percent even at 80 percent relative humidity.

Although specific components, proportions and procedures have been stated in the above description of the preferred embodiments of the novel selenium high temperature treatment, other suitable materials and procedures such as those described above may be employed to synergize, enhance or otherwise modify the novel method.

Other modifications and ramifications of the present invention would appear to those skilled in the art upon a reading of this disclosure. These are intended to be included within the scope of this invention.

What is claimed is:

1. A method of improving the humidity stability and abrsion resistance of a xerographic glass binder plate having a layer of photoconductive particles dispersed in a glass binder, which comprises; exposing said plate to a source of selenium at a temperature above about its melting point while the glass binder plate is at a temperature below about the softening point of the glass, and maintaining said temperatures for a time sufficient to diffuse selenium into the surface of the glass binder layer.

2. The product formed by the process of claim 1.

3. The method of claim 1 wherein the selenium is in the form of a vapor.

4. The method of claim 1 wherein the glass is treated in a bath of molten selenium.

5. The method of claim 1 wherein the glass is exposed to vapors of selenium mixed with an inert carrier gas.

6. The method of claim 1 wherein the glass is treated with a spray of a selenium containing compound.

References Cited

UNITED STATES PATENTS 3,012,902  12/1961  Bayer _____ 65—30 XR

DONALL H. SYLVESTER, *Primary Examiner.*

JOHN H. HARMAN, *Assistant Examiner.*

U.S. Cl. X.R.

65—30, 60; 117—104, 107, 114, 124